Sept. 14, 1954 W. SAEGER 2,689,274

RECORDING ON MAGNETIC TAPE

Filed April 30, 1953

INVENTOR.
Waldemar Saeger
BY Morris Rabkin
ATTORNEY

Patented Sept. 14, 1954

2,689,274

UNITED STATES PATENT OFFICE 2,689,274

RECORDING ON MAGNETIC TAPE

Waldemar Saeger, Gloucester, N. J., assignor to Radio Corporation of America, a corporation of Delaware Application April 30, 1953, Serial No. 352,081

4 Claims. (Cl. 179—100.2)

This invention relates to magnetic recording and more particularly to a transducing head arrangement suitable for use in multi-channel recording applications.

It has been found convenient to store data in the form of minute magnetic pulses on a magnetic recording medium for use in automatic accounting equipment. One convenient form of storing such information is in the form of binary digit codes. From the standpoint of economy of space and material, it is desirable that the quantity of recording medium be kept as small as possible. Consequently, if a binary code comprises, for example, a seven digit code, then seven channels are required to record or read such a code, which means that seven individual magnetic transducers are required. In keeping with the principle of economy, these seven transducers must be as closely spaced as possible.

A further prime requirement of a data storage system is that the recording and reading of the data be extremely accurate. The usual magnetic recording medium currently in use is a plastic tape coated on one side with magnetic iron oxide. Experience has taught that, in a great deal of the commercially available magnetic recording tape, minute flaws in the surface of the tape will cause errors to appear in a magnetically stored record due to the smallness of the recording channel as compared with the size of the flaw.

It is accordingly an object of this invention to provide a magnetic record transducer which is characterized in that the probability of flaws producing an error indication is greatly reduced.

Another difficulty which has been experienced as a result of the close spacing of the individual record transducer is that cross-talk between adjacent transducer elements occurs due to inductive coupling between adjacent units.

Accordingly it is a further object of this invention to provide an improved magnetic record transducer of the multi-channel type in which cross-talk is virtually eliminated.

In accomplishing these and other objects there has been provided, in accordance with the present invention, a multi-channel magnetic record transducer assembly in which two widely separated transducer or head units are serially connected to constitute a single two-track channel. Signal winds on the individual transducer units are so connected that induced voltages from adjacent units are neutralized within the windings.

A better understanding of this invention may be had from the following detailed description when read in connection with the accompanying drawing in which.

Figures 1, 2:
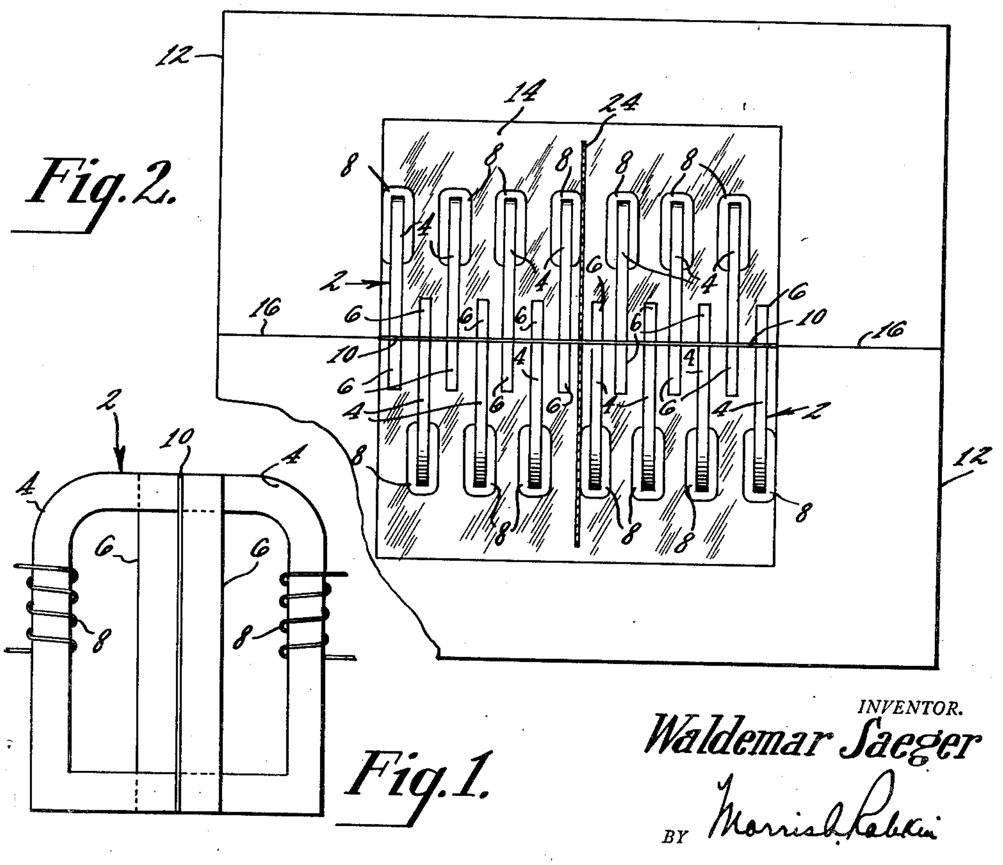
Figure 1 is an elevational view, partly schematic, of a pair of transducer units of the type suitable for use in the present invention.
Figure 2 is a plan view of a transducer assembly embodying the present invention.

Referring now to the drawings in more detail there is shown in Figure 1 a transducing head unit structure 2 which is fully described and claimed in copending application Serial No. 279,867 (RCA 33,896) filed April 1, 1952 in the name of Dallas R. Andrews. Each transducer head unit 2 comprises a substantially D-shaped core structure comprising a C-shaped core member 4 and an I-shaped core member 6. The C-shaped core member 4 carries a signal winding 8. A non-magnetic gap 10 is defined between the C-shaped core section 4 and the I-shaped core section 6. Thus each complete head unit core is asymmetrical with respect to the non-magnetic gap. The transducer units 2 are arranged with adjacent units having their asymmetrics lying on opposite sides of the non-magnetic gap 10. Such an arrangement is shown more clearly in Fig. 2 wherein the transducer units 2 are arranged in a mounting block 12 made of a suitable material such as brass. The transducer units 2 within the blocks 12 being embedded in a mass of thermoplastic material 14. The mounting block is divided transversely along the line 16 which coincides with the non-magnetic gap 10 of the transducer units 2. It may be seen that in each half of the block 12 there is alternately an I-section 6 and a D-section 4 of the core structure. Such an arrangement permits core members to be mounted in the block 12 and the surfaces dressed simultaneously. When the two halves of the block 12 are placed in face to face relationship, as shown, the I-shaped core sections 6 in one half match up with corresponding C-shaped core members 4 in the other half, and similarly the I-shaped core sections 6 in the other half match up with the C-sections 4 in the first mentioned half. The staggered arrangement thus provided permits the core sections to be more closely stacked and still leave room for each of the C-shaped core sections to carry a signal coil 8 therein.

Returning now to the assumption that the desired code will include a seven digit binary system, there has been provided what appears to be an excess of seven transducer units 2. In order to reduce the probability that a slight flaw in a record tape will produce an error in the transduced signal, each transducing channel comprises two transducer units operating in relatively widely spaced record tracks. Therefore, for a seven digit code, fourteen transducer units are required. Assuming that the transducer assembly which includes the fourteen transducer units is to be used with a magnetic tape which is the same width as has been heretofore used with a seven transducer unit assembly. The fourteen unit transducer can occupy no more space, transversely, than did the seven transducer unit assembly. Consequently each of the transducer units 2 must be smaller than the units heretofore used and must be more closely spaced. The closer spacing tends to increase the probability that signal in one winding will induce a signal into an adjacent winding, resulting in what may be called "cross talk."

Figure 3:
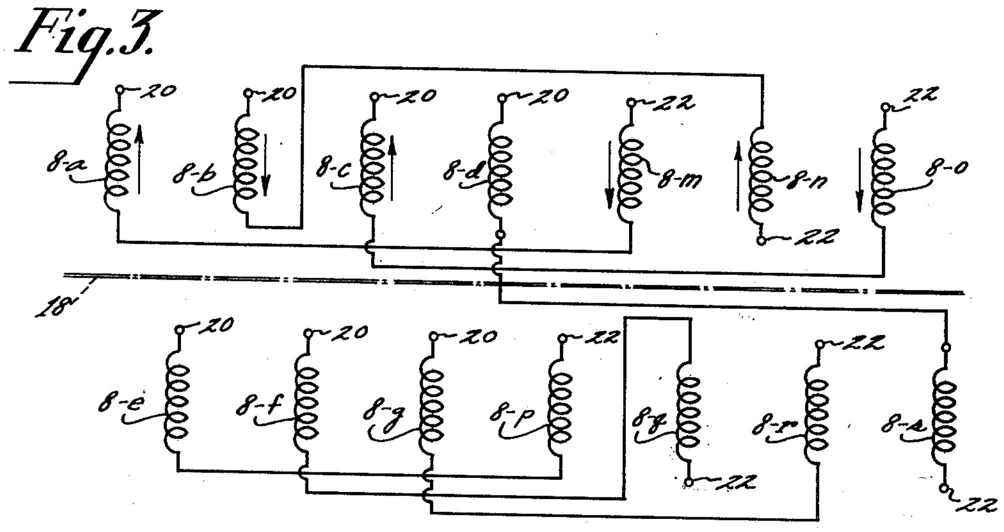
Figure 3 is a schematic wiring diagram of a transducer assembly embodying the present invention.

In Figure 3 there is is shown a schematic representation of a means of connecting the signal windings 8 of the several transducer head units in such a way that cross talk voltages induced into the windings of one set of transducer head units from adjacent units may be internally neutralized or cancelled. Each of the transducer windings 8 is serially connected with another of the windings so that two transducer units constitute a single two-track transducing channel. Thus winding 8*a* is serially connected with winding 8*m*; winding 8*b* with winding 8*n*; winding 8*c* with winding 8*o*; winding 8*d* with winding 8*s*; winding 8*e* with winding 8 *p*; winding 8*f* with winding 8*q*; winding 8 *g* with winding 8*r*. Windings 8*a, b, c, d, m, n* and *o* are the adjacent windings which would appear in one half of the head structure shown in Figure 2 while windings 8*e, f, g, p, q, r* and *s* are adjacent windings which would appear in the other half of the structure shown in Figure 2. The division line 16 between the two halves of the assembly of Figure 2 is represented schematically in Figure 1 by the double broken line 18.

Considering the windings in the first half of the block, windings 8*a, b, c* and *d* may be considered as the windings which, with their associated cores, constitute the first units of single channel pairs of units while the windings 8*m, n* and *o*, together with their associated core members, constitute the second units of single channel pairs. Similarly, in the other half of the assembly, windings 8*e, f* and *g* are windings of the first units while the windings 8*p, q, r* and *s* are the windings of the second units.

Each of the first windings is provided with a terminal 20. Assume that a positive voltage is applied to the terminal 20 of each of the first units in one half of the block. For example, a positive voltage is applied to terminal 20*a, b, c* and *d* of windings 8*a, b, c* and *d*. These windings are so connected that flux produced by current passing through the windings in response to the application of the voltage will be in the same direction in each of the windings. In other words the adjacent windings of the first units are connected to be energized in phase with respect to each other. Now consider the windings 8*m, n* and *o*. Each of these windings is also provided with a terminal 22 which may, for convenience, be connected to ground. Continuing the assumption of the positive voltage applied to the first units, the adjacent windings of the second units are so connected that the direction of the flux in the adjacent second units will be opposite with respect to each other. In other words the adjacent windings of the second units are connected to be energized in phase opposition with respect to each other.

In a similar manner the adjacent windings of the first units of the windings lying in the other half of the assembly and represented by the windings 8*e, f* and *g* are connected to be energized in phase with respect to each other while the adjacent windings of the second units represented by the windings 8*p, q, r* and *s* are connected to be energized in phase opposition with respect to each other.

By way of example, assuming for the moment that a signal is applied to windings 8*a*, and 8*c* together with their respective second windings 8*m* and 8*o* in such a manner that a flux produced in those coils is in the direction of the arrows adjacent to the respective coils. By induction, the voltage applied to coils 8*a* and 8*c* will produce a flux through winding 8*b* in the direction indicated by the arrow positioned adjacent that winding. Similarly the flux through windings 8*m* and 8*o* will induce a flux in winding 8*n* in the direction indicated by the arrow positioned adjacent that winding. It may be seen that current commensurate with the flux of windings 8*a* and 8*m* are additive as is the current through windings 8*c* and 8*o*. The current resulting from the flux in windings 8*b* and 8*m* are in opposition with respect to each other and are subtractive. Thus assuming a reasonable balance in the apparatus, the induced current through windings 8*b* and 8*m* will cancel each other.

In Figure 2 there is shown a shield member 24 separating the first units from the second units. Such a shield may be made of electrically conductive material such as beryllium copper and may be used to further nullify cross talk between the last of the first units and the first of the second units.

Thus there has been described an improved magnetic record transducer assembly which is characterized in that the probability that a flaw in a record member will produce an error in the transduced signal is greatly reduced and cross talk between adjacent transducer units of the assembly is also greatly reduced.

What is claimed is:

1. In a magnetic recorder, a multi-channel transducer comprising a plurality of head units each having a magnetic core and a signal winding cooperatively associated with said core, each of said cores having a non-magnetic gap therein and being asymmetrical with respect to said gap, said head units being arranged in closely spaced, side-by-side relationship with their non-magnetic gaps lying in a common plane with the asymmetry of adjacent units oppositely directed with respect to said plane, widely separated ones of said head units constituting pairs and having the signal windings thereof connected together serially, each pair constituting a single two-track channel, adjacent ones of said windings which together with their associated cores constitute first units of said pairs being connected to be energized in phase with respect to each other, and adjacent ones of said windings which together with their associated cores constitute second units of said pairs being connected to be energized in phase opposition with respect to each other.

2. A multi-channel magnetic record transducer comprising a plurality of head units each having a core and a signal winding cooperatively associated with said core, each of said cores being of asymmetrical, two-part construction, said head units being arranged in closely spaced, side-by-side relationship with their asymmetry alternately oppositely directed, widely separated ones of said head units constituting pairs and having the signal windings thereof connected together serially, each pair constituting a single two-track channel, adjacent ones of said windings which together with their cores constitute first units of said pairs being connected to be energized in phase wtih respect to each other, and adjacent ones of said windings which together with their associated cores constitute second units of said pairs being connected to be energized in phase opposition with respect to each other.

3. In a magnetic recorder, a multi-channel transducer characterized in that said transducer comprises a plurality of head units each having a core and a signal winding cooperatively associated with said core, said head units being arranged in closely spaced, side-by-side relationship, widely separated ones of said head units constituting pairs and having the signal windings thereof connected together serially, each pair of head units constituting a single two-track channel, adjacent ones of said windings which together with their associated cores constitute first units of said pairs being connected to be energized in phase with respect to each other, and adjacent ones of said windings which together with their associated cores constitute second units of said pairs being connected to be energized in phase opposition with respect to each other.

4. A cross talk canalling multi-channel magnetic record transducer comprising a plurality of head units each having a core and a signal winding cooperatively associated therewith, each of said cores including an I-shaped member and a C-shaped member with a non-magnetic gap therebetween, said winding being carried by said C-shaped core member, said cores being mounted in side-by-side relationship with non-magnetic gaps lying in a common plane, said head units being mounted in a supporting block in a plastic imbedment with alternate head units having their C-shaped core members on opposite sides of said common plane, widely separated ones of said head units constituting pairs and having the signal windings thereof connected together serially in pairs, each pair constituting a single two-track channel, adjacent ones of said windings which together with their associated cores constitute first units of said pairs being connected to be energized in phase with respect to each other, and adjacent ones of said windings which together with their associated cores constitute second units of said pairs being connected to be energized in phase opposition with respect to each other.

No references cited.